(12) United States Patent
Kläbe et al.

(10) Patent No.: US 12,468,687 B2
(45) Date of Patent: *Nov. 11, 2025

(54) PATCHINDEX SYSTEM AND METHOD FOR UPDATABLE MATERIALIZATION OF APPROXIMATE CONSTRAINTS

(71) Applicant: ACTIAN CORPORATION, Round Rock, TX (US)

(72) Inventors: Steffen Kläbe, Ilmenau (DE); Stephan Baumann, Ilmenau (DE)

(73) Assignee: Actian Corporation, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,032

(22) Filed: Dec. 21, 2023

(65) Prior Publication Data
US 2024/0168944 A1    May 23, 2024

Related U.S. Application Data

(63) Continuation of application No. 17/358,493, filed on Jun. 25, 2021, now Pat. No. 11,880,354.

(60) Provisional application No. 63/046,464, filed on Jun. 30, 2020.

(51) Int. Cl.
     *G06F 16/23*           (2019.01)
     *G06F 16/2455*       (2019.01)

(52) U.S. Cl.
     CPC ...... *G06F 16/2379* (2019.01); *G06F 16/2456* (2019.01)

(58) Field of Classification Search
None
See application file for complete search history.

(56) References Cited

U.S. PATENT DOCUMENTS

| | | |
|---|---|---|
| 10,412,066 B1 | 9/2019 | Vemuri et al. |
| 2005/0097072 A1 | 5/2005 | Brown et al. |
| 2005/0240615 A1 | 10/2005 | Barsness et al. |
| 2008/0172429 A1 | 7/2008 | Lin et al. |
| 2009/0292711 A1* | 11/2009 | Konik ............... G06F 16/24565 |

(Continued)

OTHER PUBLICATIONS

Adrian Vogelsgesang et al., "Get Real: How Benchmarks Fail to Represent the Real World", In Proceedings of the Workshop on Testing Database, Systems (DBTest'18). (Jun. 2018), (6 Pages Total), https://doi.org/10.1145/3209950.3209952.

(Continued)

*Primary Examiner* — Richard L Bowen
(74) *Attorney, Agent, or Firm* — ArentFox Schiff LLP

(57) ABSTRACT

Aspects described herein relate to maintaining a dataset with approximate constraints including determining, for a dataset, a constraint collection of tuples that satisfy a constraint and an exception collection of tuples that are an exception to the constraint, constructing, for the dataset, a sharded bitmap of bits, wherein each bit in the sharded bitmap indicates whether a tuple in the dataset is in the exception collection of tuples, wherein the sharded bitmap includes, for each shard of multiple shards, a bitmap of bits and a starting bit location index within the sharded bitmap of bits for the shard, and processing a query on the dataset including processing the constraint collection of tuples and the exception collection of tuples based on the sharded bitmap.

22 Claims, 9 Drawing Sheets

(56) References Cited

U.S. PATENT DOCUMENTS

| | | | | |
|---|---|---|---|---|
| 2012/0109888 | A1* | 5/2012 | Zhang | G06F 16/278 707/610 |
| 2012/0323962 | A1 | 12/2012 | He | |
| 2014/0236983 | A1 | 8/2014 | Alves et al. | |
| 2015/0317340 | A1* | 11/2015 | Sardina | G06F 16/22 707/803 |
| 2016/0085832 | A1 | 3/2016 | Lam | |
| 2018/0004813 | A1 | 1/2018 | Smith | |
| 2018/0024922 | A1 | 1/2018 | Hassan | |
| 2018/0293267 | A1 | 10/2018 | Stigsen et al. | |
| 2020/0356873 | A1 | 11/2020 | Nawrocke et al. | |
| 2021/0373916 | A1 | 12/2021 | Maycotte et al. | |

OTHER PUBLICATIONS

Arvid Heise et al., "Scalable discovery of unique col. combinations", Proceedings of the VLDB Endowment vol. 7, No. 4 (Dec. 2013), pp. 301-312. https://doi.org/10.14778/2732240.2732248.

Ashish Gupta et al., "Using partial information to update materialized views", Information Systems vol. 20, No. 8 (Dec. 1995), pp. 641-662. https://doi.org/10.1016/0306-4379(95)00035-6.

Bogdan Ghita et al., "White-box Compression: Learning and Exploiting Compact Table Representations", CIDR 2020, 10th Conference on Innovative Data Systems Research, Amsterdam, The Netherlands, (Jan. 12-15, 2020), (7 Pages Total) Online Proceedings. www.cidrdb.org. http://cidrdb.org/cidr2020/papers/p4-ghita-cidr20.pdf.

Fabian Nagel et al., "Recycling in pipelined query evaluation", In 2013 IEEE 29th International Conference on Data Engineering (ICDE). (2013), (13 Pages Total).

Frank Wm. Tompa et al., "Maintaining materialized views without accessing base data", Information Systems vol. 13, No. 4 (Jan. 1988), pp. 393-406. https://doi.org/10.1016/03064379(88)90005-1.

Guido Moerkotte., "Small Materialized Aggregates: A Light Weight Index Structure for Data Warehousing", Proceedings of 24th VLDB Conference (1998), pp. 476-487., http://www.vldb.org/conf/1998/p476.pdf.

Henning Köhler et al., "Possible and Certain SQL Keys", Proceedings of the VLDB Endowment, vol. 8, No. 11 (Jul. 2015), pp. 1118-1129. https://doi.org/10.14778/2809974.2809975.

International Search Report and Written Opinion, issued by International Searching Authority in related International Application No. PCT/US2021/039405, mailed on Sep. 29, 2021.

Jose A. Blakeley et al, "Efficiently Updating Materialized Views", Article in ACM SIGMOD Record • Feb. 1970 DOI: 10.1145/16894.16861, (1986), (12 Pages Total), https://www.researchgate.net/publication/2603834.

Jose A. Blakeley et al., "Join index, materialized view, and hybrid-hash join: a performance analysis", (1990) Proceedings Sixth International Conference on Data Engineering. pp. 256-263. https://doi.org/10.1109/ICDE.1990.113476.

Jose A. Blakeley et al., "Updating derived relations: detecting irrelevant and autonomously computable updates", Proceedings of the Twelfth International Conference on Very Large Data Bases, (1986), pp. 457-466).

Kaiyu Li et al.,Approximate Query Processing: What is New and Where to Go? A survey on Approximate Query Processing, Data Science and Engineering 3, 4 (Dec. 2018), pp. 379-397. https://doi.org/10.1007/s41019-0180074-4.

Marcin Zukowski et al., Information Systems, Super-Scalar RAM-CPU Cache Compression, Report INS-E0511, Proceedings of the 22nd International Conference on Data Engineering, ICDE 2006, (Jul. 2005), (21 Pages Total) https://doi.org/10.1109/ICDE.2006.150.

Michael J. Cahill et al., "Serializable isolation for snapshot databases", In Proceedings of the 2008 ACM SIGMOD international conference on Management of data (SIGMOD '08). Association for Computing Machinery, Vancouver, Canada, (2008), (pp. 729-738) https://doi.org/10.1145/1376616.1376690.

Michael L. Fredman., "On computing the length of longest increasing subsequences", Discrete Mathematics 11, 1 (1975), pp. 29-35. https://doi.org/10.1016/0012-365X(75)90103-X.

Patrick Valduriez., "Join indices", ACM Transactions on Database Systems vol. 12, No. 2 (Jun. 1987), pp. 218-246. https://doi.org/10.1145/22952.22955.

Peter Boncz et al., "MonetDB/X100: Hyper-Pipelining Query Execution", Proceedings of the 2005 CIDR Conference, (2005), (pp. 225-237).

Peter Boncz et al., "TPC-H Analyzed: Hidden Messages and Lessons Learned from an Influential Benchmark", Performance Characterization and Benchmarking. vol. 8391. (2014), (16 Pages Total), Springer International Publishing, Cham, https://doi.org/10.1007/978-3-319-04936-6 5 Series Title: Lecture Notes in Computer Science.

Sandor Heman et al., "Positional update handling in col. stores", In Proceedings of the ACM SIGMOD International Conference on Management of Data, SIGMOD 2010, (Jun. 6-10, 2010), (12 Pages Total), https://doi.org/10.1145/1807167.1807227.

Stefan Hagedorn et al., "Cost-Based Sharing and Recycling of (Intermediate) Results in Dataflow Programs", 22nd European Conference, ADBIS 2018, Budapest, Hungary, (Sep. 2-5, 2018), (14 Pages Total), Proceedings. https://doi.org/10.1007/978-3-319-98398-1 13.

Steffen Kläbe et al., "Patchindex—Exploiting Approximate Constraints in Selfmanaging Databases", 2020 IEEE 36th International Conference on Data Engineering Workshops (ICDEW). (2020), pp. 139-146. https://doi.org/10.1109/ICDEW49219.2020.00014 ISSN: 24733490.

Stephan Baumann et al., "Bitwise dimensional co-clustering for analytical workloads", The VLDB Journal, (2016), (26 Pages Total) DOI: 10.1007/s00778-015-0417-y.

Thorsten Papenbrock et al., "A Hybrid Approach for Efficient Unique Column Combination Discovery", In Datenbanksysteme für Business, Technologie und Web (BTW 2017), (2017), pp. 195-204.

Ziawasch Abedjan et al., "Profiling Relational Data: A Survey." The VLDB Journal 24.4 (2015): pp. 557-581. http://dx.doi.org/10.1007/s00778-015-0389-y.

Ziheng Wei et al., "Discovery and Ranking of Embedded Uniqueness Constraints", Proceedings of the VLDB vol. 12, No. 13 (2019), pp. 2339-2352. http://www.vldb.org/pvldb/vol12/p2339wei.pdf.

* cited by examiner

PATCHINDEX SYSTEM AND METHOD FOR UPDATABLE MATERIALIZATION OF APPROXIMATE CONSTRAINTS

CLAIM OF PRIORITY UNDER 35 U.S.C. § 119

The present application is a Continuation of U.S. patent application Ser. No. 17/358,493, filed Jun. 25, 2021, which claims priority to Provisional Patent Application No. 63/046,464, entitled "PATCHINDEX SYSTEM AND METHOD FOR UPDATABLE MATERIALIZATION OF APPROXIMATE CONSTRAINTS" filed Jun. 30, 2020, which is assigned to the assignee hereof. The disclosures of the prior applications are hereby incorporated in their entirety by reference.

FIELD

The disclosures relates to databases.

BACKGROUND

In classical database theory, database schemas are well-defined and contain a set of database constraints, like primary and foreign keys, uniqueness definitions or sort keys, which offer two major advantages. First, defining constraints enables the ensurance of data integrity, which is handled automatically by the database management system (DBMS) whenever updates on the data occur. Second, constraint definitions are used in query optimization to accelerate queries containing joins, aggregations or sort operations. Here query optimizers can benefit from the constraint information by choosing optimal physical operators or optimal query plans.

Real world cloud applications often do not follow this classical theory of a well-defined database schema and contain sparse schema information. This is reinforced by the lack of a database administrator who continuously tunes the database. In general, big data applications often contain unclean data for different reasons like integrating different sources with heterogeneous schemas or real world anomalies like duplicate names, shared addresses or telephone numbers. Thus, perfect constraints may not exist in these datasets. Nevertheless, they may contain approximate constraints, which are constraints that hold for all tuples except a small set of exceptions (captured as "exception rate"). These exceptions prohibit the definition of a constraint, resulting in the loss of valuable information.

Investigations on real world datasets prove the existence of approximate constraints and encourage the need to handle them by the DBMS. The PublicBI benchmark is a collection of Tableau workbooks and allows experimental evaluation against real user datasets with their common properties, e.g. many string columns, many NULL values or the absence of constraint definitions. Some of these datasets showed a large number of approximate constraints, like the USCensus 1, the IGlocations2 1 and the IUBlibrary 1 workbook. The histogram shown in FIG. 1 represents the distribution of approximate constraint columns for these datasets. The USCensus 1 workbook is a very wide dataset containing over 500 columns, from which 15 columns match an approximate sorting constraint. Nine columns match the sorting constraint with over 60% of their tuples. The IGlocations2 1 and the IUBlibrary 1 workbooks contain a small number of columns, from which a relatively large amount follow an approximate uniqueness constraint. Many of these columns are nearly perfectly unique. Where the columns are not perfectly sorted or perfectly unique, however, constraint-based operations or optimizations may not be performed on the data.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, the disclosure provides a computer-implemented method for maintaining a dataset with approximate constraints that includes determining, for a dataset, a constraint collection of tuples that satisfy a constraint and an exception collection of tuples that are an exception to the constraint, constructing, for the dataset, a sharded bitmap of bits, wherein each bit in the sharded bitmap indicates whether a tuple in the dataset is in the exception collection of tuples, wherein the sharded bitmap includes, for each shard of multiple shards, a bitmap of bits and a starting bit location index within the sharded bitmap of bits for the shard; and processing a query on the dataset including processing the constraint collection of tuples and the exception collection of tuples based on the sharded bitmap.

In another aspect, the disclosure provides a system for database operation that includes a memory configured to store instructions, and one or more processors communicatively coupled with the memory. The one or more processors are configured to determine, for a dataset, a constraint collection of tuples that satisfy a constraint and an exception collection of tuples that are an exception to the constraint, construct, for the dataset, a sharded bitmap of bits, wherein each bit in the sharded bitmap indicates whether a tuple in the dataset is in the exception collection of tuples, wherein the sharded bitmap includes, for each shard of multiple shards, a bitmap of bits and a starting bit location index within the sharded bitmap of bits for the shard, and process a query on the dataset including processing the constraint collection of tuples and the exception collection of tuples based on the sharded bitmap.

In other aspects, the disclosure provides a computer-readable medium including code executable by one or more processors for database operation. The code includes code for determining, for a dataset, a constraint collection of tuples that satisfy a constraint and an exception collection of tuples that are an exception to the constraint, constructing, for the dataset, a sharded bitmap of bits, wherein each bit in the sharded bitmap indicates whether a tuple in the dataset is in the exception collection of tuples, wherein the sharded bitmap includes, for each shard of multiple shards, a bitmap of bits and a starting bit location index within the sharded bitmap of bits for the shard, and processing a query on the dataset including processing the constraint collection of tuples and the exception collection of tuples based on the sharded bitmap.

Additional advantages and novel features relating to implementations of the present disclosure will be set forth in part in the description that follows, and in part will become

DETAILED DESCRIPTION

Figure 1:
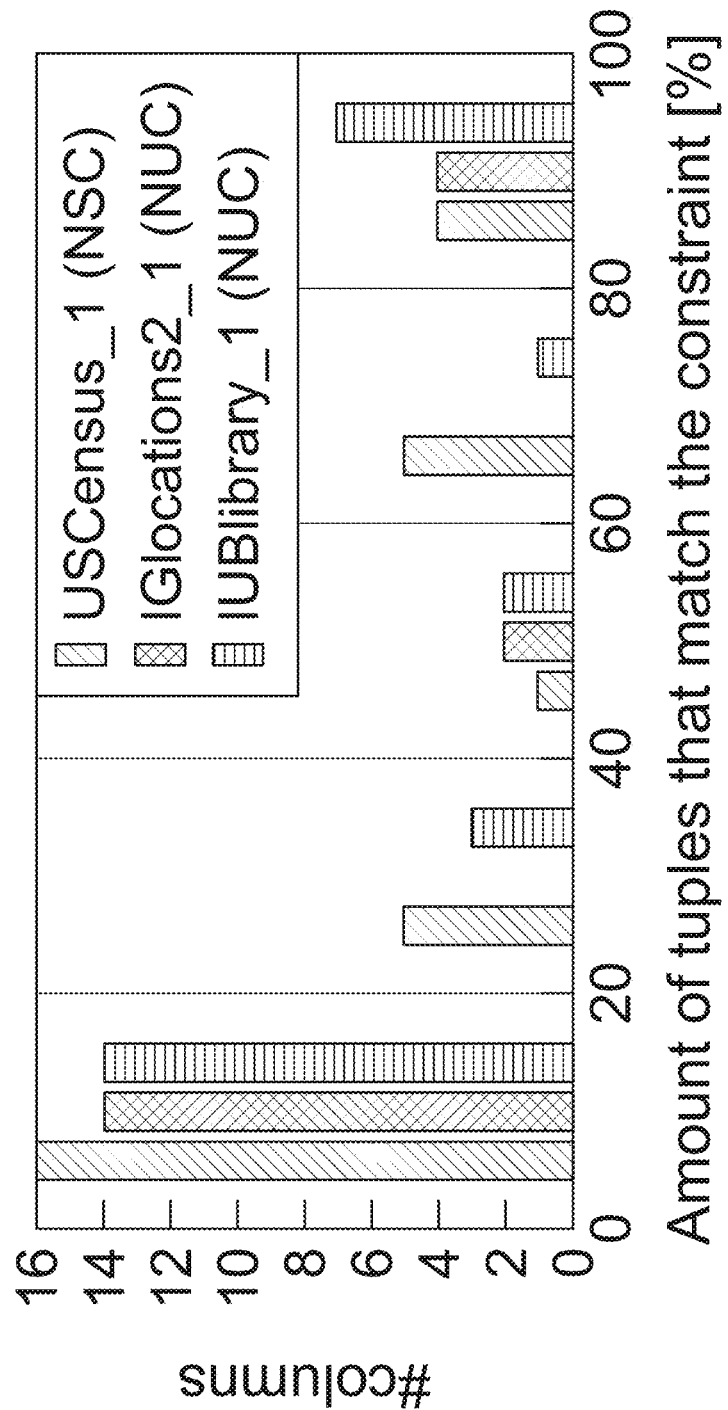
FIG. 1 is a histogram over approximate constraint columns in PublicBI datasets.

Incorporated in its entirety by reference is "PatchIndex—Exploiting Approximate Constraints in Selfmanaging Databases" by Steffen Kläbe, Kai-Uwe Sattler, and Stephan Baumann 2020, in 2020 IEEE 36th International Conference on Data Engineering Workshops (ICDEW). 139-146. https://doi.org/10.1109/ICDEW49219.2020.00014 ISSN: 24733490 (referred to hereinafter as "Kläbe"). Kläbe relates to PatchIndexes, which allows the definition of approximate constraints and enables database systems to benefit from the constraint information in query execution by materializing exceptions and handling them separately. The article provides constraint discovery mechanisms for nearly unique columns (NUC) and nearly sorted columns (NSC) and compares different design approaches. The evaluation shows the positive impact of the concept on query performance even for high exception rates.

The materialization of information is a widely investigated topic in the database research field, particularly in the context of materialized views. While significantly impacting query performance, the major drawback of materialized views is their update support. For select-project-join views, which is a subset of possible materialized views, there are efficient ways to support table updates and keeping views consistent. These methods typically try to avoid base table access by determining relevant and irrelevant updates and performing differential update operations. Besides that, materialized information should be chosen based on the expected benefit, so intermediate results of frequent queries are a good candidate for materialization. A benefit-based approach for choosing intermediate results may be possible and/or may also include the probability of a materialized result to be usable in future queries to the cost model. Representing queries as operator trees, the usage probability and the updatability is higher the smaller the operator tree of the materialized result is. Nevertheless, these approaches do not take updatability into account. Besides materialized views, there are several specialized materialization approaches like SortKeys, which materialize a certain tuple order, or JoinIndexes and Bitwise Dimensional Co-Clustering for join materialization. While JoinIndexes materialize foreign key joins by maintaining an index to the join partner as an additional table column, Bitwise Dimensional Co-Clustering physically co-locates join partners of different tables in the same partition for partitioned and distributed databases.

Research on approximate constraints evolved from the field of constraint discovery. For the uniqueness constraint, approaches for unique column combinations (UCCs) and respective discovery algorithms were developed to handle perfect constraints. In order to also handle approximate uniqueness constraints, the concepts of "possible" and "certain" keys were introduced to enforce constraints by replacing violating tuples. Besides that, embedded uniqueness constraints (eUC) separated uniqueness from completeness to enforce the uniqueness constraint only on a subset of tuples and were implemented based on views.

The concept of patch processing is known and is commonly used in compression. Handling exceptions to certain distributions separately, the PFOR, PFOR-DELTA and PDICT compression schemes may be provided. These approaches show robustness by handling outliers separately. Furthermore, white-box compression learns distributions and properties of data in order to choose appropriate compressing schemes. Here, tuples that do not follow a certain behavior can be compressed using a different compression scheme than the remaining tuples, significantly improving compression rates as a result. These approaches modify the way data is physically stored to handle exceptions, which significantly differs from the disclosed system and method that are described below.

Updating datasets can be of significant importance in real world data warehouse applications, and one issue with the materialization of information may be the update support. Aspects described herein enhance the PatchIndex feature by providing a generic and updatable materialization approach for approximate constraints. In particular, aspects described herein relate to index design, integration and update support for, or otherwise considering, approximate constraints.

In some aspects, a sharded bitmap data structure can be used as the underlying concept of the PatchIndex, offering efficient insert, modify and delete operations. Aspects described herein may be implemented in a database/data warehouse, such as that commercially provided by Actian Corporation and/or may be implemented as a plurality of lines of instructions/code that may be executed by a processor of a database manager system (or a computer system that hosts the data warehouse or database) to perform the processes described below. Alternatively, aspects described herein may be implemented as one or more hardware manufactures (e.g., an integrated circuit, application-specific integrated circuit (ASIC), field-programmable gate array (FPGA), state machine, and/or the like) that perform the processes described below.

Aspects described herein can exploit the materialized PatchIndex information about approximate constraints in the execution of distinct, sort and join queries. Aspects described herein may further have lightweight update support of the materialized information. As a consequence, constraints are allowed to become approximate over time, even if they were perfect at the time of constraint definition. This reduces the abortion of update operations compared to perfect constraints. By carefully designing the index structure and not changing the physical data order, aspects described herein can hold multiple (approximate) sort keys per table.

The PatchIndex system and method can discover exceptions to a given constraint using different techniques for different constraints, and the PatchIndex structure can maintain the identifiers (IDs) of the exceptions in a sharded bitmap structure. During query execution, the dataflow of a table scan can be split into tuples matching the constraint and exceptions by the PatchIndex scan (which may be realized using two special select operators). Both dataflows can then be handled separately and unioned afterwards. Typically, expensive operations are unnecessary for tuples matching the constraint, leading to a speedup in query performance. Query plans for Aggregation and Join queries are described herein as well.

The PatchIndex system and method can provide different update approaches to handle table updates while maintaining the PatchIndex properties. To handle these updates efficiently in the underlying bitmap structure, aspects described herein relate to using the sharded bitmap approach. With this approach, it becomes possible to delete bits from the bitmap in an efficient way (deleting bits is not supported by standard bitmap implementations). To further accelerate this, Aspects described herein can provide a parallel and vectorized bulk delete operation.

The PatchIndex system and method provides technical results and a technical solution to the above described technical problems of existing systems. Aspects described herein enable database systems to define constraints although not all tuples match the constraint which was not possible with existing techniques. Aspects described herein also accelerate queries using the constraint information, maintain the index properties in case of table updates without impacting the update performance in a major way, and/or migrate a constraint into an almost constraint when needed.

In the above mentioned and below described examples, database processing is improved by allowing separation of tuples that comply with a constraint, which is likely most of the tuples in a dataset (e.g., a table or other database construct), from tuples that do not satisfy constraint (e.g., a uniqueness or sorting constraint). This allows for constraint-based optimization of the tuples that comply with the constraint and separate processing of the tuples that do not comply with the constraint. This improves operation of the database by allowing that dataset that does not completely satisfy a constraint to be advantageously optimized in part for faster processing (e.g., query processing) on the portion that complies with the constraint. This can also improve operation of a computer by providing for more efficient database storage and query result processing.

Index Design

Aspects described herein can use a PatchIndex data structure that is a sharded bitmap, which relies on dividing a physical bitmap into virtual shards. The sharded bitmap approach can provide efficient support for deletes using vectorized delete operations and parallelized and vectorized bulk delete operations as described below in more detail.

Overview

Kläbe et al. propose the concept of PatchIndexes that enables DBMS to define and materialize approximate constraints and the discovery mechanisms for NUC and NSC to determine the tuple identifiers of exceptions to the given constraint. These identifiers are maintained by the PatchIndex data structure. The system and method use a bitmap-based approach for the PatchIndex data structure that uses a single bit for each tuple of the indexed column, indicating whether the tuple is an exception or not. PatchIndexes can be integrated into query execution by the PatchIndex scan, merging the PatchIndex information on-the-fly with the dataflow, and splitting the dataflow into a flow of tuples that satisfy the constraint and a flow of exceptions to the constraint. This can enable separate operations on both dataflows, which may in some examples be concurrently performed. The PatchIndex scan can use an additional selection operator on top of a scan operator, which merges the PatchIndex information on-the-fly to the dataflow according to selection modes exclude_patches and use_patches. Results may show that the concept of PatchIndexes significantly increases query performance for different queries and even high exception rates, resulting in the choice for the bitmap-based design approach due to its constant memory consumption.

In database systems, there can be multiple types of table updates, including insert, modify and delete operations. With the underlying bitmap data structure, inserts and modifies can be handled efficiently. For inserts, reallocating/resizing the bitmap and setting single bits can be performed, while for modifies single bits can be changed. Delete operations may be more complex. One possible solution is to shift the bitmap towards the deleted position, which potentially shifts large amounts of memory and may decrease performance. Other possible solutions are described in further detail below, which may include further enhancements to the physical data structure design.

Physical Design Approaches

Aspects described herein relate to optimizing the bitmap-based data structure towards efficient delete operations by keeping the changes invoked by more locally deleting a bit to avoid adapting the whole bitmap.

One possible approach is to invalidate deleted bits. This way, only metadata is changed instead of changing the actual bitmap. This can be realized by using a second bitmap, indicating whether a bit in the actual bitmap is valid or not. Although this enables very efficient deletes by changing a single bit in the metadata, it has possible drawbacks. First, it doubles the memory consumption of the index structure, and second, it can lead to inefficient bit access. In order to access a single bit, the bitmap is traversed from the start to get the number of invalid bits. As a result, this approach significantly impacts the frequent set( ) and get( ) operations of the bitmap structure.

A second possible approach is splitting the bitmap into multiple smaller bitmaps and maintaining the access to them in an additional metadata structure. This way, deleting a single bit only affects the bitmap holding the bit and the metadata structure, so the invoked changes can be local as desired. This approach may add another level of indirection to the bit access methods, as the metadata structure may be accessed first to then access the actual bitmap holding the bit.

Sharded Bitmap Design

Figure 2:
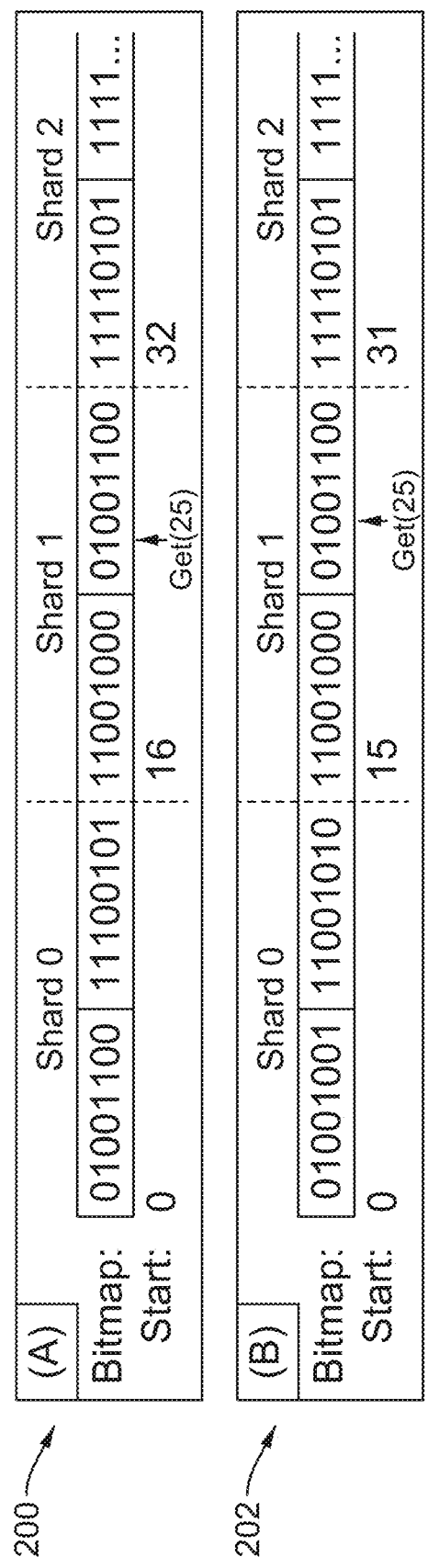
FIG. 2 shows a sharded bitmap design before (A) and after (B) deleting the bit in position 5.

The sharded bitmap is a bitmap data structure that efficiently supports delete operations while keeping additional memory consumption low. Aspects described herein relate to dividing a physical, potentially large bitmap into virtual shards in order to keep delete operations local and to enable parallelism in update operations. Aspects described herein also facilitate fine-grained locking and logging for efficient concurrency control. FIG. 2 illustrates a design concept of the data structure. The bitmap 200 is realized using an array of addressable elements. While these elements are 64 bit types in our implementation, the size was reduced to 8 bits in FIG. 2 for clarification. A virtual shard then consists of multiple addressable elements and a single additional integer value indicating the index of the first bit in a shard.

Sharded Bitmap Operations—Bit Access

Single bit access methods set( ), get( ) and unset( ) can be performed in two steps. First, the position of the bit can be calculated by determining the addressable element using a division of the position by the size of an addressable element (realized using a bit shift) and determining the position within an element using a bitwise AND operation with a bitmask. In a second step, the bit can be changed or returned using another bitwise operation.

To access a single bit in the sharded bitmap structure having multiple shards of one or more bits, the shard that includes the bit can be determined. This can be efficiently realized using a bit shift and additional comparisons with the start values of the upcoming shards. The additional comparisons may be used as a bit may be included in a subsequent shard due to previous delete operations. Then the bit can be accessed using the position relative to the start value of the shard in a similar way as the ordinary bitmap. This way, accessing a single bit in the sharded bitmap may only be slightly slower than in ordinary bitmaps.

Sharded Bitmap Operations—Delete

Deleting a single bit in the sharded bitmap can be divided into multiple steps, including determining the position of the bit, as described above, shifting all subsequent bits within the shard by one position towards the deleted bit, and/or decrementing the start values of all subsequent shards.

As an example, the result of deleting the bit at position 5 is shown in FIG. 2. The bitmap 202 shows the changed elements. Note that after deleting a bit, the values of subsequent elements change after the bit at position 5 within shard 0, which is the desired semantic of the delete operation. In the example, the bit at position 25 after the delete operation is the bit at position 26 before the delete. Compared to ordinary bitmap operations, shifting the bits within the shard and decrementing the start values of subsequent shards are tradeoffs, as the impact of a delete operation to a single shard is limited by the shifting of bits within the shard, but decrementing the start values uses additional effort afterwards to adjust metadata. Therefore, the choice of the shard size can impact the data structure and corresponding bitmap operations.

In an example, shifting the bits within the shard can involves cross-element bit shifts, which can be realized by a sequence of bit masking and shifting operations. In order to further accelerate this step, aspects described herein may include a vectorized cross-element shifting algorithm that can use Advanced Vector Extensions Version 2 (AVX2) intrinsic s and can be based on shifting, masking, and permutation intrinsic s to enable data exchange between AVX lanes. An example of an algorithm that is used inside the loop over the data of a shard is shown in Listing 1 (assuming pre-defined constant bit masks for shifting and masking).

Listing 1

```
// Load data to axv vector
__m256i x = _mm256_loadu_si256((__m256i *)data);
// Get last bit of each element
__m256i y = _mm256_and_si256 (x, bit_mask);
// First bit will be last bit of previous element
y = _mm256_sllv_epi64 (x, shift_mask63);
// Save element at pos 0 for next iteration
bits = _mm256_blend_epi32(bits, y, 0x03);
```

Listing 1

```
// Rotation Mask : (3, 3, 2, 1) is 1111001
__m256i_rotated=_mm256_permute4x64_epi64(y, 0xF9);
// Copy element from last iteration to pos 3
rotated = _mm256_blend_epi32(rotated , bits, 0xC0);
// Saved element to pos 3 for next iteration
bits = _mm256_permute4x64_epi64(bits, 0x24);
// Shift data
x = _mm256_srlv_epi64(x, shift_mask1);
// Insert bit from next element
x = _mm256_or_si256(x, rotated);
// Store back to data
_mm256_storeu_si256((m256i *)data, x);
```

Sharded Bitmap Operations—Bulk Delete

Figure 3:
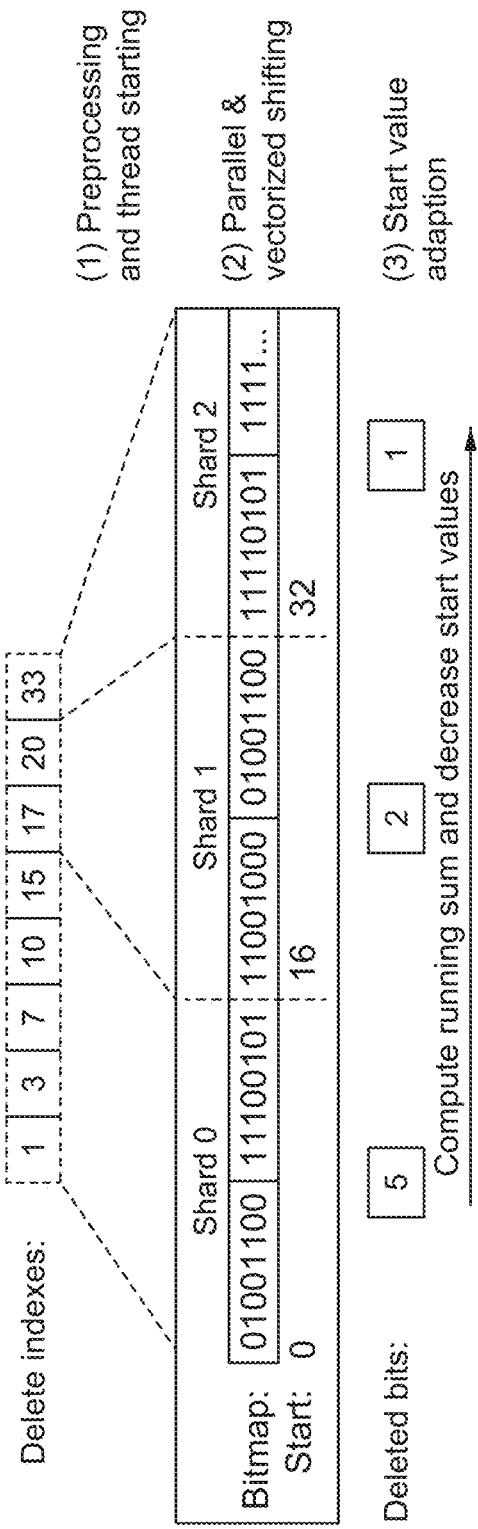
FIG. 3 shows a parallel and vectorized bulk delete operation.

To reduce the effort of changing the start value array and to exploit the opportunities of the sharding approach for parallelism, a bulk delete operation can be used with the sharded bitmap structure. An example of the bulk delete operation is shown in FIG. 3. After a preprocessing step to determine the shards that belong to the elements being deleted, shifting within the single shards can be performed in parallel using threads, as bit shifts remain local to the shards due to the design of the data structure. A thread can be created for each shard that includes indexes of elements to be deleted, so the total number of threads can be, or can be dependent on, the number of shards and the location of deleted positions. The actual bit shift can again be realized using the vectorized algorithm shown in Listing 1. At the end of the operation, multiple start values can be adapted in a single array traversal by holding a running sum over deleted bits of all preceding groups. This way, the vectorized and parallelized bulk delete operation minimizes the additional effort of updating start values while further accelerating shifting of element bits within the shards.

The bulk delete operation can be order sensitive, as deleting a bit within a shard can shift subsequent bits, changing their position. As a result, positions of bits that are intended to be deleted can be adjusted if there were deleted bits with smaller positions before to ensure correctness. Thus, for example, delete operations can be performed in descending order, starting from the largest position. In aspects described herein, the PatchIndex structure can buffer the rowIDs of tuples that are to be deleted and can perform a bulk delete operation at the end of the transaction. This can ensure the order of the rowIDs to enable an efficient bulk delete.

Sharded Bitmap Operations—Condense

With each single delete operation, a bit at the end of a shard may be dropped or become unused, as the subsequent bit from the following shard is not necessarily shifted to this position. In some examples, aspects described herein can include a condense operation, which shifts the elements of the bitmap between shards and resets the utilization of the structure as a result. The condense operation is realized using a single traversal over the bitmap. For each shard, data of subsequent shards can be shifted to the bits that were lost due to delete operations and the start values can accordingly be adapted. Condensing can be triggered manually or automatically by monitoring the utilization of the bitmap and triggering once a certain threshold is reached.

Query Processing

Aspects described herein may integrate PatchIndexes into analytical queries including join, sort and distinct operators as well as integration into a system's cost model. Furthermore, aspects described herein can help to solve the problem of handling table updates by designing the PatchIndex to handle them in an efficient way.

Analytical Queries

A PatchIndex scan can be used or designed to split the dataflow of a scan operator into a flow of tuples fulfilling a constraint and a flow of patches (e.g., exceptions that may not fulfill the constraint). This way, both dataflows can be separately processed. For query optimization using PatchIndexes, query subtrees can be cloned for data and exceptions and both subtrees can be separately optimized, and the PatchIndex information in the dataflow that excluded the patches exploited, to achieve a speedup in this subtree. In accordance with aspects described herein, both subtrees can be combined to ensure transparency for the remaining query execution tree.

Analytical Queries—Distinct Operator

Figure 4:
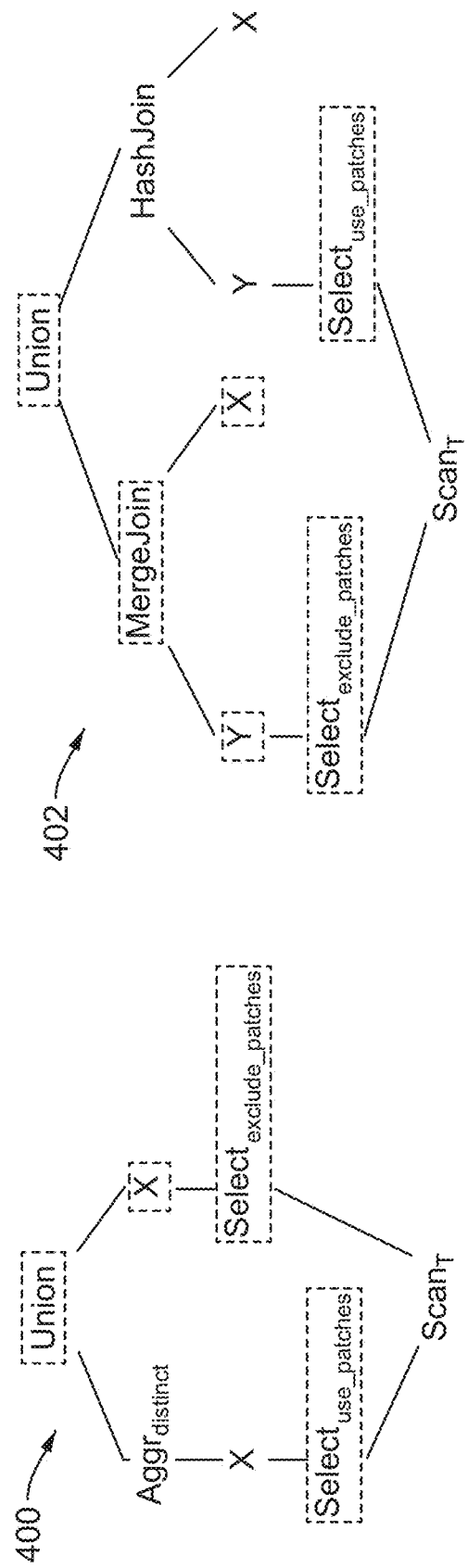
FIG. 4 shows a query plans for distinct (left) and join (right) queries before and after PatchIndex optimizations.

FIG. 4 illustrates a query plan 400 where the information about a NUC can be exploited in distinct queries. Here the most expensive operator of the query plan 400 can be the distinct aggregation, while X is an arbitrary subtree that does not contain any joins or aggregations. As data is ensured to be unique after excluding patches, the aggregation can be processed on the patches, which is the significantly smaller part of the data, and may not be needed to be processed on the unique data. A Union operator can then merge both dataflows. Distinct can also be combined with grouping, e.g. to get the distinct number of elements for each group. PatchIndexes can also be integrated into that kind of queries by splitting the aggregation into a distinct aggregation followed by the grouping aggregation. Here the PatchIndex is only applied at the distinct aggregation, not impacting the actual grouping. In the partitioned case, data can be partitioned on the grouping key, which is typically realized by a repartitioning after the scan operation. As the whole subtree is copied below a distinct aggregation when applying the PatchIndex, the repartitioning takes place in both subtrees and the partitioning is preserved by the Union operator after the distinct aggregation. This way, the correctness of the query rewriting may be automatically ensured. Newly added operators for PatchIndex are shown in dashed-lined boxes.

Analytical Queries—Join Operator

FIG. 4 also illustrates a query plan 402 where join queries can be accelerated by exploiting the information about a NSC. Here, the query plan 402 replaces the generic HashJoin operator with the significantly faster MergeJoin operator after excluding patches, if there is a PatchIndex on the join column and the join partner X is sorted on the join column. This is a frequent case for joins of fact tables with dimension tables, which are typically sorted on the dimension key. While subtree Y must preserve the tuple order and is therefore not allowed to include aggregations, both X and Y may include join operators that are order preserving, so e.g. being the probe side of a HashJoin. Under these requirements, the PatchIndex information can be propagated through a query tree. If the result of the join operator is not required to be sorted, a Union operator combines the results of both subtrees. while a MergeUnion can merge the results in case of an order requirement. Newly added operators for PatchIndex are shown in dashed-lined boxes.

This approach offers additional opportunities for optimization. On the one hand, the result of subtree X can be used twice in the query tree and can therefore be buffered instead of computed twice. On the other hand, join sides can be swapped to further accelerate the HashJoin. As the number of patches is known during optimization time, the build side of the HashJoin as the one with the lowest cardinality can be selected to improve the time and space for hash table building. As the number of patches is typically small, building the hash table on the patches may often be the best, or best performing, decision. In order to combine results of both subtrees again, the join sides of the MergeJoin operator can be similarly chosen. As the MergeJoin operator is not sensitive to join sides, this may have no, or negligible, impact on performance.

Analytical Queries—Sort Operator

Besides the join operator, the information about a NSC can also be used to accelerate sort queries as a major part of the data is already sorted. Here an approach similar to distinct queries can be followed, so the query plan can be similar to query plan 400 in FIG. 4, but exchanging the aggregation with the sort operator. If there is a PatchIndex defined on the sort column using the same ordering as the sort operator, the sort operator becomes obsolete in the subtree that excludes patches, as these tuples are already known to be sorted. The sort operation can then only be performed on the patches, which is intended to be the minor part of the data. In order to preserve the sort order, the results of both subtrees can be combined using a Merge operator instead of a Union operator.

Analytical Queries—Cost Model

The use cases for query optimization presented in the preceding subsections can be integrated into the cost models of arbitrary query optimizers, as cardinalities and operator output estimates are known during optimization time and ordinary query operators can be used for the optimization, except the newly introduced selection modes for the PatchIndex scan. The costs for query trees (build and execution costs) produced by the PatchIndex optimizations can therefore be estimated by query optimizers and if the estimated costs are smaller than the costs of the subtree before the optimization, the PatchIndex can be used for the query. The selection operators with modes exclude_patches and use_patches merge the PatchIndex information on-the-fly to the output dataflow of the scan operator. This process is particularly independent from the data types of the input data, as the decision whether to pass or drop a tuple is based on the tuple's rowIDs. As a consequence, the operators overhead may be fixed for every tuple.

Update Queries

Handling table update operations like inserts, deletes or modifies may be an issue in materialization. As table updates were not present at the time a materialization was computed, it may reach an inconsistent state whenever an update occurs. One way to handle this inconsistency is refreshing, often leading to an expensive recomputation. For some use cases, minor inconsistencies might be acceptable and refresh cycles can be loosely chosen, while other applications rely on consistent and up-to-date data and therefore demand for very tight or just-in-time refresh cycles.

On the contrary, PatchIndexes can be designed to efficiently support table update operations. As the updates are handled immediately or soon, in time, after they occur, inconsistent states can be avoided. In order to perform these updates efficiently, the design of the update handling mechanisms can be driven by the goal of avoiding an index recomputation and avoiding a full table scan while preserving the invariant of holding all exceptions to a given constraint. The basic ideas for handling inserts, deletes and modifies differ for the specific constraints and can be summarized as follows. For NUC insert operation, scan inserted tuples, join them with the table, merge the results with the existing patches. For NSC insert operations, determine a new sorted subsequence extending the already existing one. For NUC delete operations, drop tracking information of deleted tuples. For NSC delete operations, drop tracking information about deleted tuples. For NUC modify operations, scan modified tuples, join them with the table, merge the results with the existing patches. For NSC modify operations, merge all modified tuples with the existing patches.

For the design of the update handling mechanisms the following technologies that are commonly used in analytical, column-store based DBMS, may be used:

- Delta structures: Delta structures can be used to maintain table updates in-memory instead of writing them to disk, which is a typical approach for read-optimized column-stores.
- Summary tables: Summary tables can be used to collect certain information about columns. As an example, small materialized aggregates, also called Minmax indexes, can be used which materialize minimum and maximum values for buckets of tuples, enabling data pruning during scans by the evaluation of e.g. selection predicates.
- Range propagation: Range propagation can extend the use of minmax indexes to push scan ranges across join operators. While static range propagation enables pushing scan ranges across joins during query build phase, dynamic range propagation dynamically generates scan ranges during query execution, e.g. during the build phase of HashJoins.
- Intermediate result caching: Caching can be used within queries to avoid expensive recomputations. Intermediate results can be materialized in main memory and read again from the counterpart of the materialization operator. The Reuse operator can be used to encapsulate this behavior. This operator can occur as an inner node of the query execution tree, meaning that it materializes the input, or as a leaf node, meaning that it reads the materialized intermediate result again.

Update queries—Insert

Figure 5:
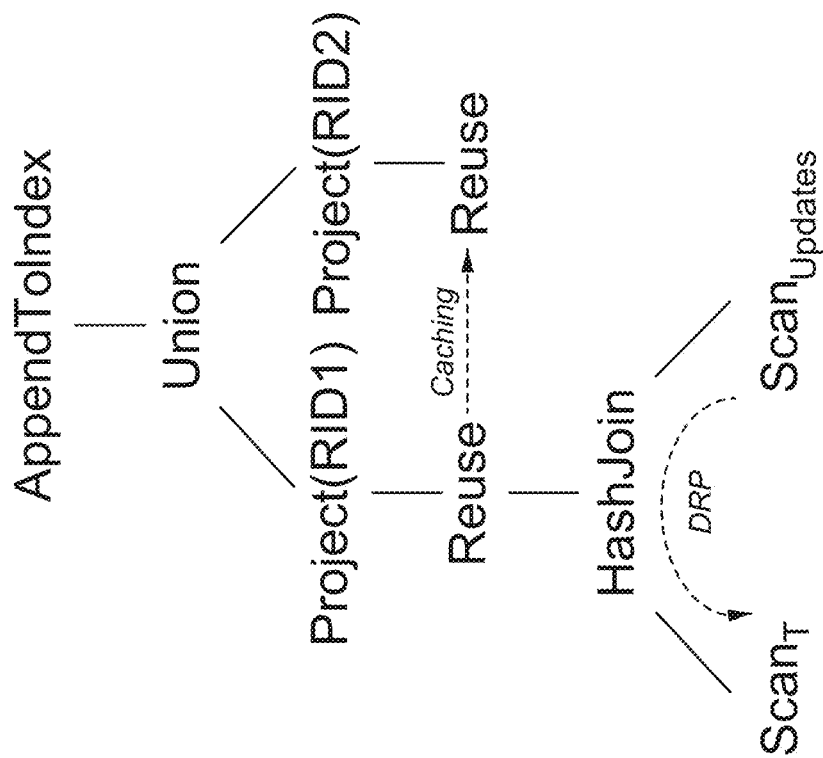
FIG. 5 shows an insert handling query for inserts on Table T with dynamic range propagation (DRP) and intermediate result caching.

Handling insert operations in the PatchIndex includes determining which tuples have to be added to the existing patches. The uniqueness constraint may rely on a global view of the table. Inserting a single tuple might produce a collision with another tuple that was already in the table and had a unique value in the indexed column before. To keep track of all occurrences of non-unique values to ensure correctness, for example, a join query may be performed after the insert operation, joining the inserted tuples with the actual table (including inserted values, as duplicates might also occur in the inserts) like shown in FIG. 5. Afterwards rowIDs of both join sides can be projected using intermediate result caching. The rowIDs can then be merged into the existing patches. This way, the capability of holding the minimum set of patches to make the table unique when excluding them can be preserved, and a recomputation of the full index can be avoided. In order to avoid the full table scan, dynamic range propagation can be utilized. After the build phase of the join operator is finished, scanning the full table can be reduced to only the blocks that contain potential join partners. This significantly reduces I/O overhead and can improve the insert handling mechanism.

For the sorting constraint, a local view on the inserted tuples can be considered instead of a global view on the whole table by extending the already existing sorted subsequence with inserted values instead of recomputing a globally longest sorted subsequence. The PatchIndex keeps track of the last value of the subsequence (i.e. the largest value of an ascending sort order or the smallest value of a descending sort order). During execution of the insert query, the PatchIndex can temporarily store inserted values and can compute a longest sorted subsequence with all values being larger/smaller than the last value of the existing sorted sequence. An example of the longest sorted subsequence algorithm can include the algorithm in the discovery of a NSC, as explained in Kläbe. The rowIDs of tuples that are not included in this extending sorted subsequence can be added to the set of patches. Combining two sorted sequences that have a maximum length for two parts of the data might not form a longest sorted sequence for the combination of the two parts, which can be shown, e.g., for the table holding values (1, 2, 10) and inserted values (3, 4). Nevertheless this does not lead to wrong query results when applying the PatchIndex information as described above and may be negligible for the typical use cases. In some examples, this may be mitigated by monitoring the exception rate and triggering a global recomputation once a certain threshold is reached.

From an implementation point of view, scanning the inserted values can be realized by exploiting the presence of positional delta trees (PDTs) and extending them with a mechanism to only scan the entries the current query inserted. Furthermore, merging the determined results with the existing patches can translate to either merging the two lists for the identifier-based approach or reallocating the bitmap and setting the respective bits for the new patches in the bitmap-based approach.

Update Queries—Modify

For the uniqueness constraint, handling modify operations can be done similarly to insert handling described above. For the sorting constraint, all modified tuples have to be added to the set of patches, as modifying values might destroy the sorting of the computed subsequence. One difference in the actual realization is that reallocating the bitmap for the bitmap-based approach may become obsolete, as the table cardinality may not change during modify operations.

Update Queries—Delete

Deletions can be handled by the PatchIndex by dropping the information about deleted tuples from the patch information without taking a global picture of the table into account. For both uniqueness and sorting constraint, dropping values from the table may not violate the constraint. For the uniqueness constraint, a value that was not unique before the delete operation might become unique afterwards if the other occurrences of the value was deleted. Nevertheless, it may remain in the patches to keep the delete handling mechanism simple and may not lead to wrong query results when applying the PatchIndex to queries. The same holds for the sorting constraint, probably losing optimality when deleting values from the existing longest subsequence. As described, monitoring and recomputing can be performed to optimize the dataset when desired.

From an implementation point of view, deleting values may raise the problem that rowIDs of subsequent tuples may decrease for each deleted tuple. This may be considered when deleting patches for the identifier-based approach by decrementing every identifier by the number of deleted tuples with a smaller rowID in a single run through the set of patches. For the bitmap-based approach, this may be realized by the bulk delete operation of the sharded bitmap data structure as described above.

Concurrency and Recovery

In terms of concurrency control, PatchIndexes can seamlessly integrate into a system's snapshot isolation mechanism. Although snapshot isolation may be a coarse-grained way to achieve serializability of transactions, it may be sufficient for read-optimized DBMS. Nevertheless, PatchIndexes can offer opportunities for a more fine-grained concurrency control due to the underlying sharded bitmap data structure. As bitmap shards are independent from each other, fine-grained locking can be used to avoid concurrent access without locking the whole data structure. Adapting the start values of a sharded bitmap may not produce conflicts, as the only operation that adapts the start values is the delete operation which uses decrement operations. Concurrent decrements may not be conflicts, as different orders of executing a series of decrements can produce the same result.

PatchIndexes can be designed as main memory data structures. In order to keep the database log memory efficient, logging the actual PatchIndex information can be avoided, so PatchIndexes can be recreated after a system shutdown or failure. As an alternative, the PatchIndex information can be persisted to disk in combination with the logging of all succeeding update operations after persisting a state of the index.

Figure 6:
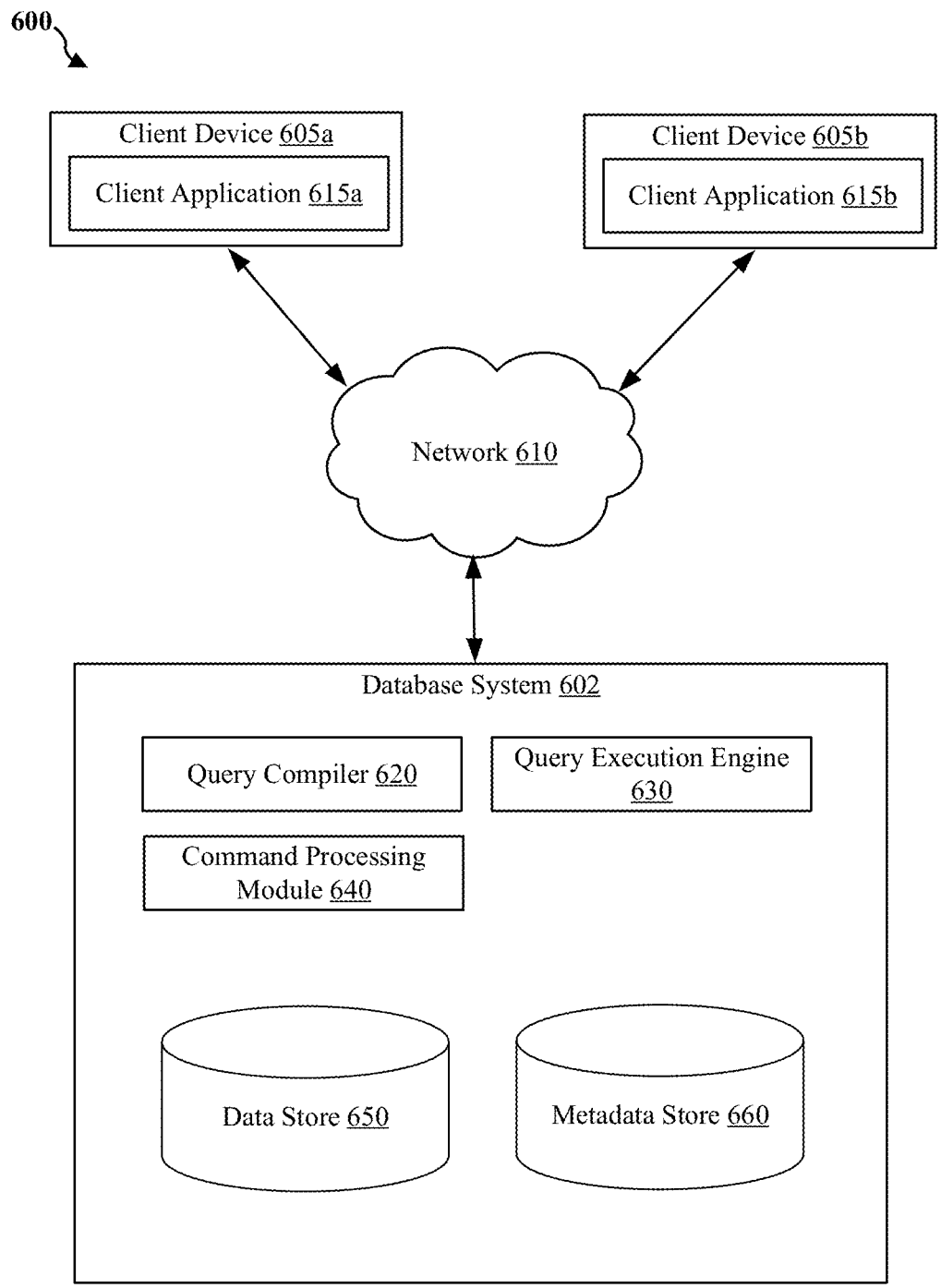
FIG. 6 illustrates an example of a computing system including a database system, in accordance with aspects described herein.

FIG. 6 illustrates an example of a computing system 600 including a database system 602, in accordance with an aspect of the disclosure. The database system 602 has multiple architectural components including a query compiler 620, a query execution engine 630, a command processing module 640, a data store 650, and a metadata store 660. (A letter after a reference numeral, such as "605 a," indicates that the text refers specifically to the element having that particular reference numeral, while a reference numeral in the text without a following letter, such as "605," refers to any or all of the elements in the figures bearing that reference numeral, i.e., "605 a," "605 b," "605 c," etc.)

The database system 602 can include any type of processor, for example, standard x86 servers running Linux or multi-core systems. Users and applications may communicate with the database system 602 via standard interfaces, for example, American Nation Standards Institute (ANSI) structured query language (SQL) via open database connectivity (ODBC)/Java database connectivity (JDBC). The database system 602 is also interchangeably referred herein as "the system" or "database."

The database system 602 performs processing and storing of data. The database system 602 controls sessions, parsing and optimizing queries, and scheduling execution of the workload. The database system 602 may be optimized for outward communication and handling of query overhead so the resources of the database system 602 are utilized for performing data operations.

The data store 650 stores data on a data storage device, for example, a disk. This data includes relations or tables comprising rows and columns of user data. For instance, example tables are t1, t2, t3, . . . , tn, where table t1 has columns a1, b1, c1, table t2 has columns a2, b2, c2, table t3 has columns a3, b3, c3, and so on unless indicated otherwise. In some aspects, data stored in one column is of the same data attributes. For example, data stored in the same column is of the same data type, character set, and collation attribute value.

The metadata store 660 stores metadata associated with the data stored in the data store 650. In some aspects, the metadata store 660 stores metadata for each column of the data table stored in the data store 650. Example metadata includes a data type of the data stored in a column, a collation attribute, and the like. A value of the collation attribute corresponds to a collation used with a particular character set. A collation is a set of rules for comparing characters in a character set. In other examples described herein, metadata store 660 may also store the sharded bitmap with bits describing whether corresponding tuples comply with a constraint or are an exception.

The database system 602 maintains and updates the metadata (e.g., collation value, sharded bitmap, etc.) stored in the metadata store 660. As one example, if a database administrator or query requests to update data in the database, the database system 602 can update to add, modify, delete, etc., the data, and can also manage the metadata 660 corresponding to the tuple being updated, as described herein, to ensure the metadata 660 reflects whether the tuple complies with a constraint or is an exception thereto.

The metadata stored in the metadata store 660 provides a mechanism for the database system 602 to determine processing of a dataset stored in the database system 602 during query processing time, as described further herein. For example, the metadata stored in the metadata store 660 can enable separating the dataset into a first collection of tuples that satisfy a constraint (also referred to herein as a constraint collection of tuples) and a second collection of tuples that are an exception to the constraint (also referred to herein as an exception collection of tuples). This can allow for separate operations on the separate collections of tuples, such as optimizing at least the first collection of tuples that satisfy this constraint. Accordingly, at least the first collection of tuples, which can include most of the tuples in NUC or NSC data, can be optimized, and the outlier data (e.g., the exceptions that do not satisfy the constraint) can be separately processed.

The query compiler 620 receives queries from client devices 605 and generates execution plans for the received queries. Users and applications can issue queries. For a particular query, the query compiler 620 compiles the query to generate an execution plan for execution of the query and may perform one or more optimizations (e.g., separately on separate collections of tuples, as described). An execution plan includes an ordered set of steps used to access data in the database system 602. The execution plan can include a complete set of physical operators for executing the database query and relationships between the physical operators. A physical operator produces an output data set from one or more input data sets. Hash join, sort merge join, index scan, or transliterate are some example physical operators. The query compiler 620 provides the execution plans to the query execution engine 630 for execution.

The query compiler 620 can determine whether to identify separate collections of tuples, as one collection that satisfies a constraint and one collection that does not, when generating an execution plan for a query, at least where the query is for retrieving data. In this regard, the query compiler 620 can use the sharded bitmap to determine the collections of tuples, as described above and further herein, and may optimize at least the collection of tuples that satisfies the constraint. For an update query, for example, the query complier 620 can modify metadata that is associated with updated tuples in the metadata store 660 along with the tuple within the dataset itself.

The code generator 680 can receive an execution plan and can translate the execution plan into sequences of query steps specified using executable code. The query execution engine 630 can generate and execute the generated executable code. The query execution engine 630 can implement the physical operators included in the execution plan. For example, if an execution plan includes retrieving or updating metadata, the query execution engine 630 can retrieve or update the metadata for data stored in the column, as described above and further herein.

The command processing module 640 can receive commands and can process the commands. Commands are instructions that are used to communicate with the database system 602 to perform specific tasks (e.g., administrative tasks) for configuring the database system 602. The commands may be received from client devices 605 and/or the query compiler 620. Create table, delete table, and alter table are some example commands. For example, to process a create table command, the command processing module 640 may create and store a new table in the data store 650 according to the attributes specified in the create table command. The command processing module may update the metadata store 660 to store the metadata for the table, column, etc. that is created or altered, as described herein.

Client devices 605 can be computing devices that execute client software, e.g., a web browser or built-in client application, to interact with the parallel database system 602 via a network. Note that the terms "client" or "client device," as used herein may refer to software providing respective functionality, to hardware on which the software executes, or to the entities operating the software and/or hardware, as is apparent from the context in which the terms are used. For example, a client device 605 may execute business intelligence software or analytic tools that send interactions with the database system 602.

In one aspect, the client device 605 can be a personal computer (PC), a desktop computer, a laptop computer, a notebook, a tablet PC executing an operating system, for example, a Microsoft Windows-compatible operating system (OS), Apple OS X, and/or a Linux distribution. In another aspect, the client device 605 can be any device having computer functionality, such as a personal digital assistant (PDA), mobile telephone, smartphone, etc. In an aspect, a client of the database system can be another process, for example, a web server that serves queries from remote devices.

The interactions between the client devices 605 and the database system 602 can typically be performed via a network 610, for example, via the Internet. The network 610 enables communications between the client device 605 and the database system 602. In one aspect, the network 610 uses standard communications technologies and/or protocols. In another aspect, the entities can use custom and/or dedicated data communications technologies instead of, or in addition to, the ones described above. Depending upon the variation, the network 610 can also include links to other networks such as the Internet. In addition, for example, portions of the database system 602 may be remotely located from one another, and may communicate over the network 610, Internet, etc. In an example, as described, data can be stored in multiple date stored 650 distributed over a network 610, such as in a cloud-computing environment. In another example, metadata associated with the data in a given data store 650 can be stored at a same or different physical location than the data store 650. As such, in yet another example, metadata can be distributed in multiple metadata stores 660 or may be in a single metadata store 660.

Figure 7:
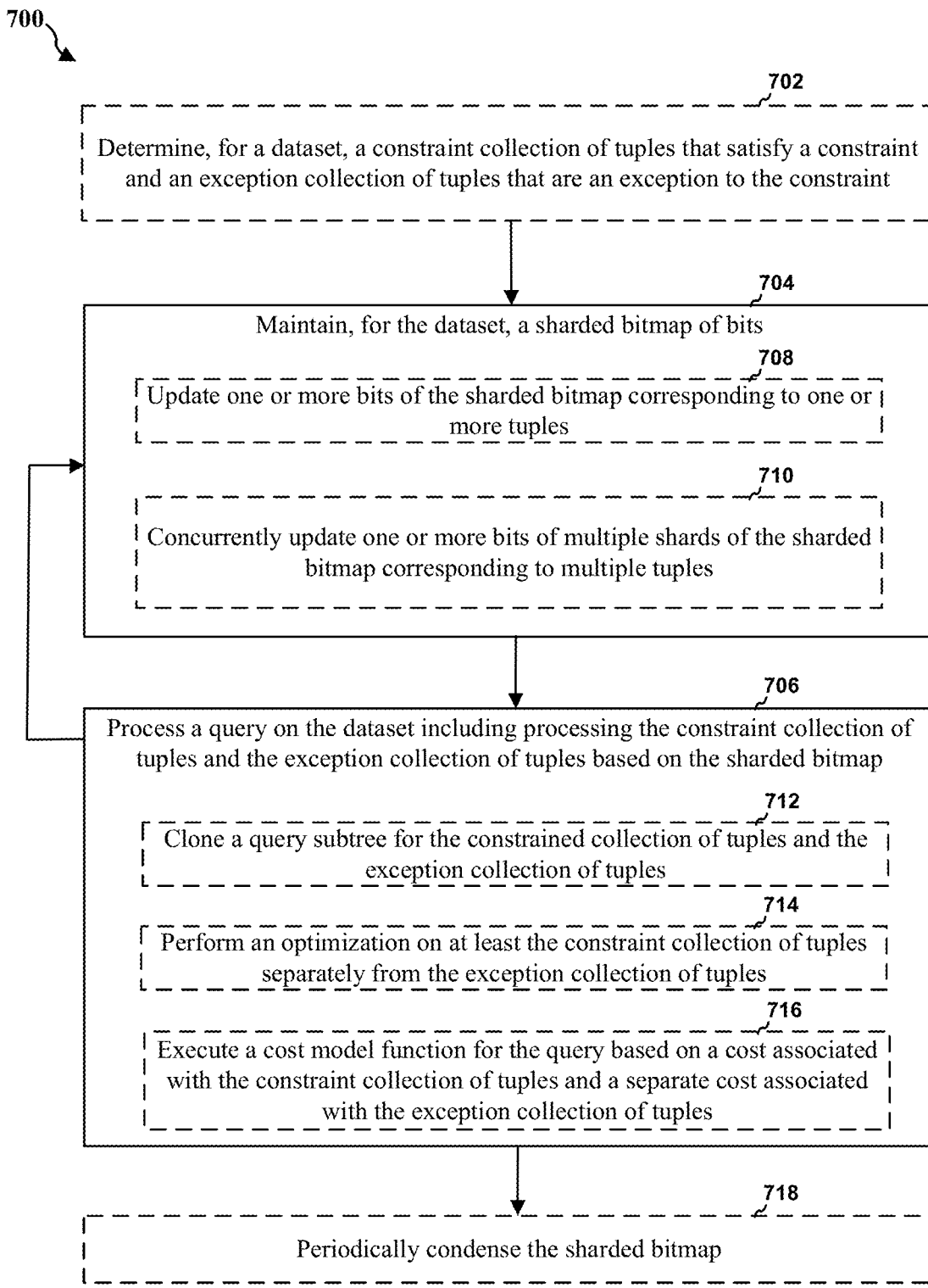
FIG. 7 illustrates an example of a method for managing sharded bitmaps for datasets with approximate constraints, in accordance with aspects described herein.

FIG. 7 is a flowchart of an example of a method 700 of database operation for accessing collections of tuples based on a sharded bitmap. The method 700 may be performed by one or more components of the database system 602, such as query compiler 620, query execution engine 630, command processing module 640, etc.

At block 702, the method 700 may optionally include determining, for a dataset, a constraint collection of tuples that satisfy a constraint and an exception collection of tuples that are an exception to the constraint. For example, one or more components of the database system 602, such as query compiler 620, query execution engine 630, command processing module 640, etc., in conjunction with one or more processors, a memory storing instructions for executing on a processor and/or related data, etc., may determine, for the dataset, the constraint collection of tuples that satisfy a constraint and the exception collection of tuples that are an exception to the constraint. For example, the constraint collection of tuples can be determined based on performing a query for data in the dataset that satisfies the constraint, and the exception collection of tuples can be determined as the remaining data in the dataset that is not in the constraint collection of tuples. In an example, the collections of tuples can be determined during initialization or activation, among other processes, of the database system 602 or a component thereof, and/or may be periodically re-performed to improve query performance, as described further herein.

At block 704, the method 700 may include maintaining, for the dataset, a sharded bitmap of bits. For example, one or more components of the database system 602, such as query compiler 620, query execution engine 630, command processing module 640, etc., in conjunction with one or more processors, a memory storing instructions for executing on a processor and/or related data, etc., may maintain the sharded bitmap of bits. For example, the sharded bitmap of bits may include multiple shards of the bitmap of bits, and a starting location index of each shard in the overall sharded bitmap, to improve efficiency of management and processing thereof, as described herein. For example, the shards can be sized to achieve a balance between updating the bitmap and processing queries on the bitmap to determine the constraint and exception collections of tuples. The bits in the sharded bitmap may each correspond to a tuple in a table of a database (e.g., in data store 650 of a database system 602). In addition, the sharded bitmap can be maintained in the metadata store 660 for the database system 602, as described. Maintaining the sharded bitmap can include setting bits to indicate whether data complies with the constraint, shifting bits when data tuples are deleted from the table, and modifying starting locations for the shards when data tuples are deleted, among other actions.

At block 706, the method 700 may include processing a query on the dataset including processing the constraint collection of tuples and the exception collection of tuples based on the sharded bitmap. For example, one or more components of the database system 602, such as query compiler 620, query execution engine 630, command processing module 640, etc., in conjunction with one or more processors, a memory storing instructions for executing on a processor and/or related data, etc., may process the query on the dataset including processing the constraint collection of tuples and the exception collection of tuples based on the sharded bitmap. In one aspect, the query can be processed based on determining the constraint collection of tuples and the exception collection of tuples using the corresponding bits in the sharded bitmap. In addition, the query can be separately processed for the collections of tuples. In this aspect, at least the constraint collection of tuples can be optimized based on the constraint to improve query performance. In addition, processing the query may include joining query results from the constraint collection of tuples with separately processed query results from the exception collection of tuples. In addition, in one example, processing the query at block 706 may include again performing block 714 to maintain or update the sharded bitmap of bits based on the query, as described further herein.

In maintaining the sharded bitmap of bits at block 704, optionally at block 708, one or more bits of the sharded bitmap corresponding to one or more tuples can be updated. For example, one or more components of the database system 602, such as query compiler 620, query execution engine 630, command processing module 640, etc., in conjunction with one or more processors, a memory storing instructions for executing on a processor and/or related data, etc., may update the one or more bits of the sharded bitmap corresponding to one or more tuples. For example, the one or more bits can be updated in conjunction with one or more operations on the data, which may be in response to a query or otherwise. In one aspect, the one or more operations may relate to updating data in the dataset, such as an insertion, modification, or deletion of data in the dataset (e.g., in data store 650).

For example, updating the one or more bits can include, for a delete operator or operation on the dataset to delete at least one tuple from the dataset, updating a shard of the sharded bitmap that includes the bit indicating whether the at least one deleted tuple is an exception to the constraint. Updating the shard can include performing a bit shift of multiple bits occurring after the bit corresponding to the at least one deleted tuple toward the bit corresponding to the at least one deleted tuple, which can effectively remove the bit corresponding to the at least one deleted tuple. Updating the shard for the delete operator can also include updating the starting location indices of the shards within the sharded bitmap that follow the shard corresponding to the deleted bit. This can be performed to reflect the bit shift performed in the shard corresponding to the deleted bit.

In another example, updating the one or more bits can include, for an insert operator or operation on the dataset to insert at least one tuple to the dataset, adding a bit for the inserted data to the sharded bitmap. In addition, updating the one or more bits may include querying the dataset to determine whether the inserted data results in existing data no longer satisfying the constraint. Querying the dataset in this regard can include performing a join operator to determine whether there is existing data that is the same as the inserted data. If this is the case, the bit for the existing data can be set to indicate that the data is an exception to the constraint, and the added bit for the inserted data can be similarly set to indicate that the new data is an exception to the constraint as well (e.g., where the constraint is a uniqueness constraint for a table with NUCs). In another example, for the insert operator, a last value of a sorted subsequence of the dataset before a location for the insertion can be stored, and corresponding bits for the at least one tuple to be inserted and one or more subsequent tuples can be set as an exception to the constraint (e.g., where the constraint is a sorting constraint for a table with NSCs).

In one aspect, updating the one or more bits can include, for a modify operator or operation on the dataset to modify at least one tuple in the dataset, querying the dataset to determine whether the modified data results in other existing data no longer satisfying the constraint. Querying the dataset in this regard can include performing a join operator to determine whether there is other existing data that is the same as the at least one tuple as modified. If this is the case, at least for tables with NUC constraint, the bit for the other existing data can be set to indicate that the data is an exception to the constraint, and the bit for the modified data can be similarly set to indicate that the new data is an exception to the constraint as well. In another example, for the modify operator for tables with NSC constraint, the bit for the modified data can be set to indicate that the new data is an exception to the constraint, as the modified data may no longer be in a sorted position.

In another example, in maintaining the sharded bitmap of bits at block 704, optionally at block 710, one or more bits of multiple shards of the sharded bitmap corresponding to multiple tuples can be concurrently updated. For example, one or more components of the database system 602, such as query compiler 620, query execution engine 630, command processing module 640, etc., in conjunction with one or more processors, a memory storing instructions for executing on a processor and/or related data, etc., may concurrently update one or more bits of multiple shards of the sharded bitmap corresponding to multiple tuples. For example, for a delete operator, where multiple tuples are deleted and the multiple tuples correspond to different shards in the sharded bitmap, the bits in each shard can be concurrently shifted within the given shards to improve performance of the bit shift, as described. A count of deleted bits can be maintained for each shard, and the count can be summed at each shard for updating a starting index location of subsequent shards.

In processing the query at block 706, optionally at block 712, a query subtree for the constraint collection of tuples and the exception collection of tuples can be cloned. For example, one or more components of the database system 602, such as query compiler 620, query execution engine 630, command processing module 640, etc., e.g., in conjunction with one or more processors, a memory storing instructions for executing on a processor and/or related data, etc., may clone the query subtree for the constraint collection of tuples and the exception collection of tuples. For example, given a query or determined query subtree or plan, the query subtree can be cloned for performing on both the constraint collection of tuples and the exception collection of tuples, such that the same or similar query processing can be separately performed for both collections of tuples. In another example, steps can be added to either query subtree that can be specific to querying the constraint collection of tuples or exception collection of tuples. As described in one example, for a distinct operator, an aggregation operator can be added to and executed on the exception collection of tuples and not on the constraint collection of tuples. As described in another example, for a join operator, a merge join can be added to an executed on the constraint collection of tuples while a hash join operator can be added to and executed on the exception collection of tuples. As described in yet another example, for a sort operator, the sort operator can be applied to the exception collection of tuples and not the constraint collection of tuples (as these tuples are already sorted at least for a NSC table). In any case, for example, a union operator (or a merge operator in case of a sorting query) can be performed for the separately processed constraint collection of tuples and the exception collection of tuples to yield the query results.

In processing the query at block 706, optionally at block 714, an optimization can be performed on at least the constraint collection of tuples separately from the exception collection of tuples. For example, one or more components of the database system 602, such as query compiler 620, query execution engine 630, command processing module 640, etc., in conjunction with one or more processors, a memory storing instructions for executing on a processor and/or related data, etc., may perform the optimization on the constraint collection of tuples separately from the exception collection of tuples. In one example, the optimization can relate to the constraint, such that the constraint collection of tuples can be optimized for query. Moreover, in this regard for example, the optimization may be performed before querying to provide an optimization when querying, or can be part of performing the query. In some examples, a separate optimization may be applied to the exception collection of tuples.

In processing the query at block 706, optionally at block 716, a cost model function for the query can be executed based on a cost associated with the constraint collection of tuples and a separate cost associated with the exception collection of tuples. For example, one or more components of the database system 602, such as query compiler 620, query execution engine 630, command processing module 640, etc., in conjunction with one or more processors, a memory storing instructions for executing on a processor and/or related data, etc., may execute a cost model function for the query based on the cost associated with the constraint collection of tuples and the separate cost associated with the exception collection of tuples. For example, the cost associated with the query can be separately determined for each collection of tuples, and can be summed to determine the total cost for the query. In an example, it can be determined whether to perform the query using the exception information or not based on comparing the cost from the executed cost model with a cost of a different query process.

At block 718, the method 700 may optionally include periodically condensing the sharded bitmap. For example, one or more components of the database system 602, such as query compiler 620, query execution engine 630, command processing module 640, etc., e.g., in conjunction with one or more processors, a memory storing instructions for executing on a processor and/or related data, etc., may periodically condense the sharded bitmap to improve performance of operations using the sharded bitmap. For example, the sharded bitmap can be condensed at least in part by, for multiple shards of the sharded bitmap, shifting undeleted bits of a subsequent shard towards deleted bits of a preceding shard and updating the starting bit location index of the preceding shard to reflect the additional valid bits. This can be performed based on detecting a condition that may indicate decreased performance, based on a periodic timer or time-of-day, and based on requested resource utilization of the database system 602 being below a threshold, among other factors.

Figure 8:
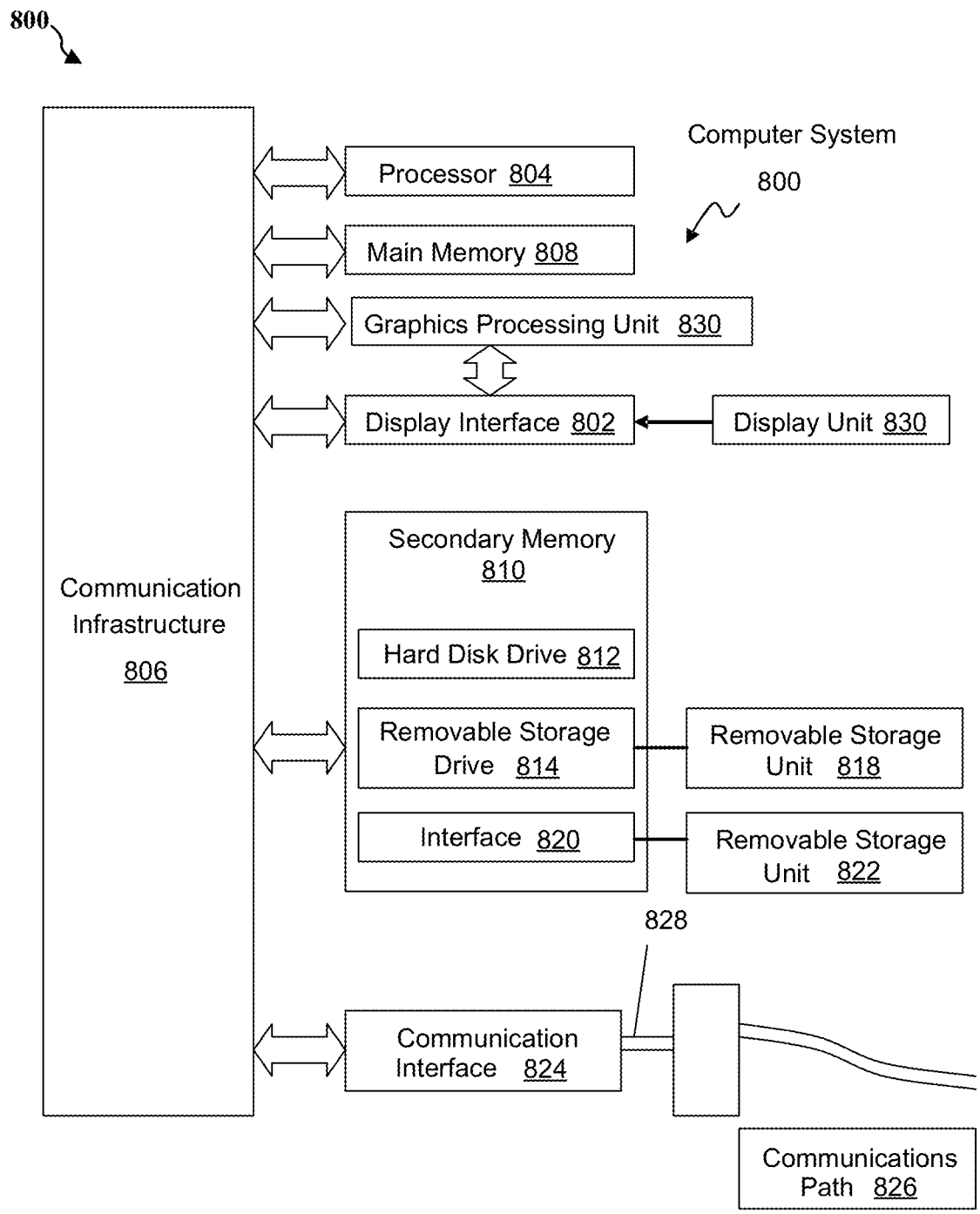
FIG. 8 presents an example system diagram of various hardware components and other features, for use in accordance with aspects of the present disclosure.

FIG. 8 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 800 is shown in FIG. 8.

Computer system 800 includes one or more processors, such as processor 804. The processor 804 is connected to a communication infrastructure 806 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 800 may include a display interface 802 that forwards graphics, text, and other data from the communication infrastructure 806 (or from a frame buffer not shown) for display on a display unit 830. Computer system 800 also includes a main memory 808, preferably random access memory (RAM), and may also include a secondary memory 810. The secondary memory 810 may include nonvolatile memory, for example, a hard disk drive 812, flash memory and/or a removable storage drive 814, representing a floppy disk drive, a magnetic tape drive, an optical disk drive, etc. The removable storage drive 814 reads from and/or writes to a removable storage unit 818 in a well-known manner Removable storage unit 818, represents a USB memory drive, SD card, floppy disk, magnetic tape, optical disk, etc., which is read by and written to removable storage drive 814. As will be appreciated, the removable storage unit 818 includes a computer usable storage medium having stored therein computer software and/or data.

In alternative aspects, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828, which may be electronic, electromagnetic, optical or other signals capable of being received by communications interface 824. These signals 828 are provided to communications interface 824 via a communications path (e.g., channel) 826. This path 826 carries signals 828 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 814, a hard disk installed in hard disk drive 812, and signals 828. These computer program products provide software to the computer system 800. Aspects of the disclosure are directed to such computer program products.

Computer programs (also referred to as computer control logic) are stored in main memory 808 and/or secondary memory 810. Computer programs may also be received via communications interface 824. Such computer programs, when executed, enable the computer system 800 to perform various features in accordance with aspects of the present disclosure, as discussed herein. In particular, the computer programs, when executed, enable the processor 804 to perform such features. Accordingly, such computer programs represent controllers of the computer system 800.

In variations where aspects of the disclosure are implemented using software, the software may be stored in a computer program product and loaded into computer system 800 using removable storage drive 814, hard disk drive 812, or communications interface 820. The control logic (software), when executed by the processor 804, causes the processor 804 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 9:
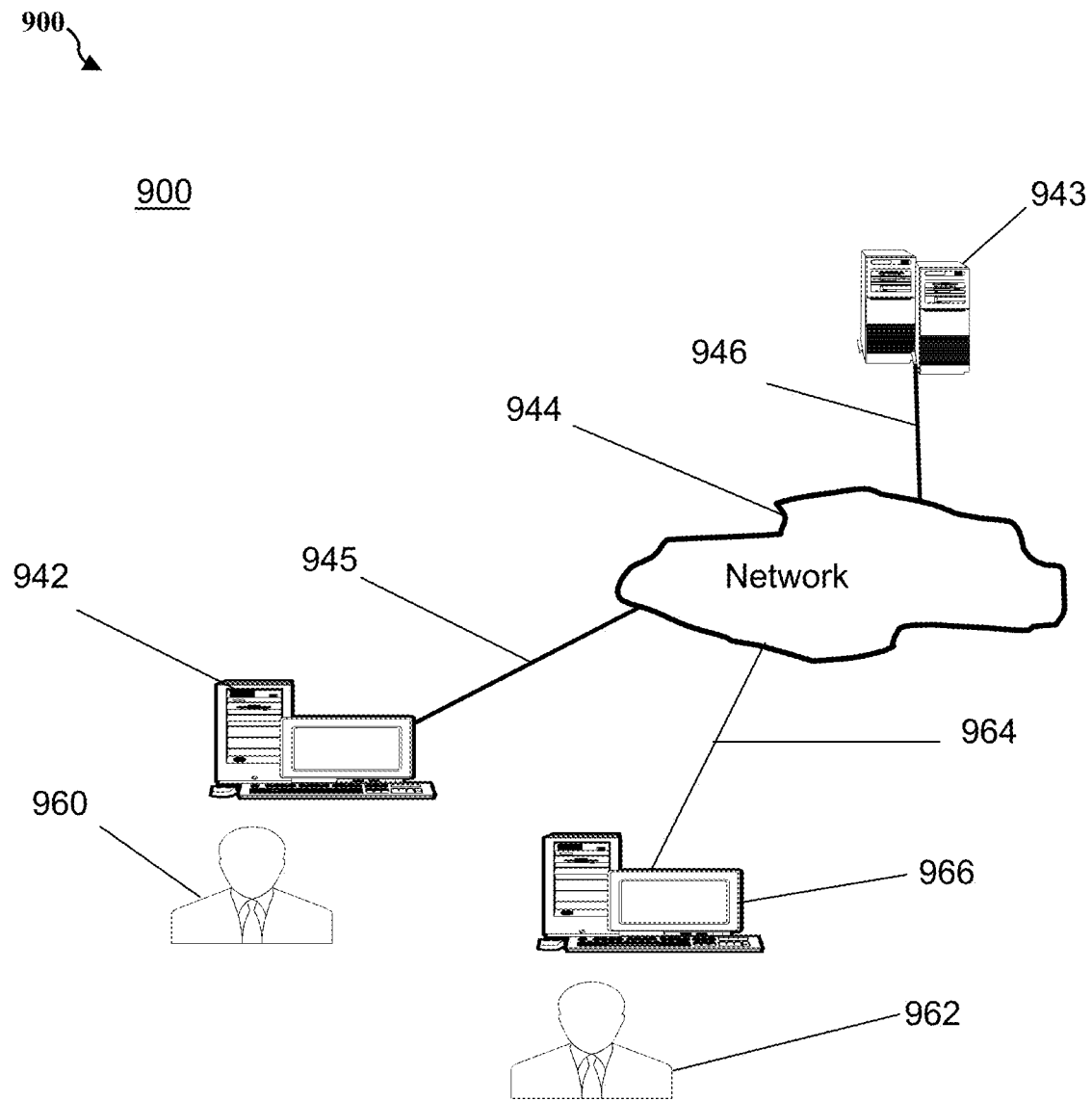
FIG. 9 is a block diagram of various example system components, for use in accordance with aspects of the present disclosure.

FIG. 9 is a block diagram of various example system components (e.g., on a network) that may be used in accordance with aspects of the present disclosure. The system 900 may include one or more accessors 960, 962 (also referred to interchangeably herein as one or more "users") and one or more terminals 942, 966. In one aspect, data for use in accordance with aspects of the present disclosure may, for example, be input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944, such as the Internet or an intranet, and couplings 945, 946, 964. The couplings 945, 946, 964 include, for example, wired, wireless, or fiber optic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The foregoing description, for purpose of explanation, has been with reference to specific aspects. However, the illustrative discussions above are not intended to be exhaustive or to limit the disclosure to the precise forms disclosed. Many modifications and variations are possible in view of the above teachings. The aspects were chosen and described in order to best explain the principles of the disclosure and its practical applications, to thereby enable others skilled in the art to best utilize the disclosure and various aspects with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present disclosure, for example, aspects of the innovations herein may be implemented consistent with numerous general purpose or special purpose computing systems or configurations. Various example computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The disclosure may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the disclosure have been specifically described herein, it will be apparent to those skilled in the art to which the disclosure pertains that variations and modifications of the various implementations shown and described herein may be made without departing from the spirit and scope of the disclosure. Accordingly, it is intended that the disclosure be limited only to the extent required by the applicable rules of law.

While the foregoing has been with reference to a particular aspect of the disclosure, it will be appreciated by those skilled in the art that changes in this aspect may be made without departing from the principles and spirit of the disclosure, the scope of which is defined by the appended claims.

What is claimed is:

1. A computer-implemented method for maintaining a dataset with one or more approximate constraints, comprising:
   maintaining, for a dataset of multiple data tuples, a data structure that supports indicating multiple approximate constraints of the dataset without changing physical order of the dataset, wherein the data structure indicates, per constraint of the one or more approximate constraints, a constraint collection including a first portion of the multiple data tuples that satisfy a constraint and an exception collection including a second portion of the multiple data tuples that are an exception to the constraint; and
   processing, via a database management system (DBMS), a query on the dataset including:
      processing, for the constraint collection, a first query subtree corresponding to a portion of the query; and
      separately processing, for the exception collection, a second query subtree corresponding to the portion of the query.

2. The computer-implemented method of claim 1, further comprising obtaining the constraint collection at least in part by performing a selection query for data in the dataset that satisfies the constraint.

3. The computer-implemented method of claim 2, further comprising obtaining the exception collection as remaining data in the dataset that is not obtained in the constraint collection.

4. The computer-implemented method of claim 1, wherein the constraint corresponds to a primary key.

5. The computer-implemented method of claim 1, wherein the constraint corresponds to a foreign key.

6. The computer-implemented method of claim 1, further comprising:
performing a first optimization for the constraint collection to improve performance of the query; and
separately performing a second optimization for the exception collection to improve performance of the query.

7. The computer-implemented method of claim 6, wherein the first optimization and the second optimization are performed concurrently.

8. The computer-implemented method of claim 1, further comprising merging first intermediate results from processing the first query subtree for the constraint collection with second intermediate results from separately processing the second query subtree for the exception collection to generate an intermediate resulting dataset for executing a remaining query subtree of the query.

9. The computer-implemented method of claim 8, wherein processing the first query subtree for the constraint collection and separately processing the second query subtree for the exception collection are performed concurrently.

10. The computer-implemented method of claim 1, further comprising:
maintaining, for the dataset, an additional index indicating a different constraint collection including a third portion of the multiple data tuples that satisfy a different constraint and a different exception collection including a fourth portion of the multiple data tuples that are an exception to the different constraint,
wherein processing the query includes:
processing the first query subtree for the constraint collection and the different constraint collection; and
separately processing the second query subtree for the exception collection and the different exception collection.

11. The computer-implemented method of claim 1, wherein processing the query further includes combining the first query subtree and the second query subtree for a remaining portion of the query.

12. The computer-implemented method of claim 1, wherein the first query subtree has one or more different operators than the second query subtree.

13. A system for database operation, comprising:
a memory configured to store instructions; and
one or more processors communicatively coupled with the memory, wherein the one or more processors are configured to:
maintain, for a dataset of multiple data tuples, a data structure that supports indicating multiple approximate constraints of the dataset without changing physical order of the dataset, wherein the data structure indicates, per constraint of one or more approximate constraints, a constraint collection including a first portion of the multiple data tuples that satisfy a constraint and an exception collection including a second portion of the multiple data tuples that are an exception to the constraint; and
process, via a database management system (DBMS), a query on the dataset including:
processing, for the constraint collection, a first query subtree corresponding to a portion of the query; and
separately processing, for the exception collection, a second query subtree corresponding to the portion of the query.

14. The system of claim 13, wherein the one or more processors are configured to obtain the constraint collection at least in part by performing a selection query for data in the dataset that satisfies the constraint.

15. The system of claim 14, wherein the one or more processors are configured to obtain the exception collection as remaining data in the dataset that is not obtained in the constraint collection.

16. The system of claim 13, wherein the constraint corresponds to a primary key.

17. The system of claim 13, wherein the constraint corresponds to a foreign key.

18. The system of claim 13, wherein the one or more processors are configured to:
perform a first optimization for the constraint collection to improve performance of the query; and
separately perform a second optimization for the exception collection to improve performance of the query.

19. The system of claim 13, wherein the one or more processors are configured to merge results from processing the first query subtree for the constraint collection with results from separately processing the second query subtree for the exception collection to generate a resulting dataset for the query.

20. The system of claim 13, wherein the one or more processors are configured to:
maintain, for the dataset, an additional index indicating a different constraint collection including a third portion of the multiple data tuples that satisfy a different constraint and a different exception collection including a fourth portion of the multiple data tuples that are an exception to the different constraint,
wherein the one or more processors are configured to process the query at least in part by:
processing the first query subtree for the constraint collection and the different constraint collection; and
separately processing the second query subtree for the exception collection and the different exception collection.

21. A non-transitory computer-readable medium comprising code executable by one or more processors for database operation, the code comprising code for:
maintaining, for a dataset of multiple data tuples, a data structure that supports indicating multiple approximate constraints of the dataset without changing physical order of the dataset, wherein the data structure indicates, per constraint of one or more approximate constraints, a constraint collection including a first portion of the multiple data tuples that satisfy a constraint and an exception collection including a second portion of the multiple data tuples that are an exception to the constraint; and
processing, via a database management system (DBMS), a query for the dataset including:
processing, for the constraint collection, a first query subtree corresponding to a portion of the query; and
separately processing, for the exception collection, a second query subtree corresponding to the portion of the query.

22. The non-transitory computer-readable medium of claim 21, wherein the constraint corresponds to a primary key or a foreign key.

* * * * *